United States Patent
Namatame

(10) Patent No.: US 7,308,188 B2
(45) Date of Patent: Dec. 11, 2007

(54) AUDIO REPRODUCING APPARATUS

(75) Inventor: Kazushi Namatame, Tokyo (JP)

(73) Assignee: D & M Holdings Inc., Kanagawa (JP)

( * ) Notice: Subject to any disclaimer, the term of this patent is extended or adjusted under 35 U.S.C. 154(b) by 1139 days.

(21) Appl. No.: 10/259,602

(22) Filed: Sep. 30, 2002

(65) Prior Publication Data
US 2003/0170007 A1   Sep. 11, 2003

(30) Foreign Application Priority Data
Mar. 5, 2002 (JP) ............................. 2002-058651
Mar. 5, 2002 (JP) ............................. 2002-058773

(51) Int. Cl.
H04N 9/00 (2006.01)
H04N 11/02 (2006.01)
H04N 7/00 (2006.01)
H04N 7/14 (2006.01)
G11B 15/12 (2006.01)
H02B 1/00 (2006.01)

(52) U.S. Cl. ............................. 386/39; 386/33; 386/96; 360/61; 348/14.11; 381/123

(58) Field of Classification Search ................. 386/33, 386/39, 96, 98, 52, 55, 125; 360/61; 348/14.11, 348/705; 381/123, 56; 700/94; 704/210
See application file for complete search history.

(56) References Cited

U.S. PATENT DOCUMENTS

| | | | |
|---|---|---|---|
| 4,184,047 A * | 1/1980 | Langford | 381/63 |
| 4,641,204 A * | 2/1987 | Sugiyama | 386/105 |
| 5,581,529 A * | 12/1996 | Roth et al. | 369/84 |
| 5,748,835 A | 5/1998 | Lee | |
| 6,249,324 B1 * | 6/2001 | Sato et al. | 348/705 |
| 6,583,821 B1 * | 6/2003 | Durand | 348/515 |
| 6,977,877 B2 * | 12/2005 | Mori | 369/47.24 |
| 2001/0024568 A1 | 9/2001 | Mori | |

FOREIGN PATENT DOCUMENTS

| | | |
|---|---|---|
| EP | 0 500 049 A1 | 8/1992 |
| EP | 0 999 549 A2 | 5/2000 |
| JP | 11-112255 | 4/1999 |
| JP | 11-289594 | 10/1999 |
| JP | 2000-331431 | 11/2000 |
| JP | 2001-195822 | 7/2001 |
| JP | 2002-42423 | 2/2002 |

* cited by examiner

Primary Examiner—Mehrdad Dastouri
Assistant Examiner—Syed Y. Hasan
(74) Attorney, Agent, or Firm—Dickstein Shapiro LLP

(57) ABSTRACT

Even when both a digital audio signal and an analog audio signal are inputted, a type of inputted digital audio signal is identified, and an internal signal path is automatically switched based on the result of the identification operation and previously set content. A main storage of a host microcomputer 12 stores signal path information indicating a signal path to be selected for each type of digital audio signal inputted from each external AV apparatus. A DIR 3 identifies the type of digital audio signal inputted from a digital input terminal 1. The host microcomputer 12 switches an A/D switching selector 4 and an analog direct/DSP process switching selector 7 respectively so that a signal path corresponding to the type of signal shown in the result of an identification operation of the DIR 3 is selected, based on the signal path information.

2 Claims, 6 Drawing Sheets

FIG.2

SIGNAL PATH SELECTION MENU
(EXTERNAL MACHINE: DVD#1)

| INPUT SIGNAL | SIGNAL PATH |
|---|---|
| 1. PCM | : ANALOG DIRECT |
| 2. DOLBY DIGITAL | : ANALOG DSP |
| 3. DTS | : DIGITAL |
| 4. MPEG2 AAC | : DIGITAL |
| 5. NON-CORRESPONDING INPUT SIGNAL | : ANALOG DIRECT |

FIG.3

| EXTERNAL AV MACHINE | INPUT SIGNAL | SIGNAL PATH |
|---|---|---|
| DVD#1 | PCM | ANALOG DIRECT |
| | DOLBY DIGITAL | ANALOG DSP |
| | DTS | DIGITAL |
| | MPEG2 AAC | DIGITAL |
| | NON-CORRESPONDING INPUT SIGNAL | ANALOG DIRECT |
| CD#1 | PCM | DIGITAL |
| | ⋮ | ⋮ |
| | ⋮ | ⋮ |

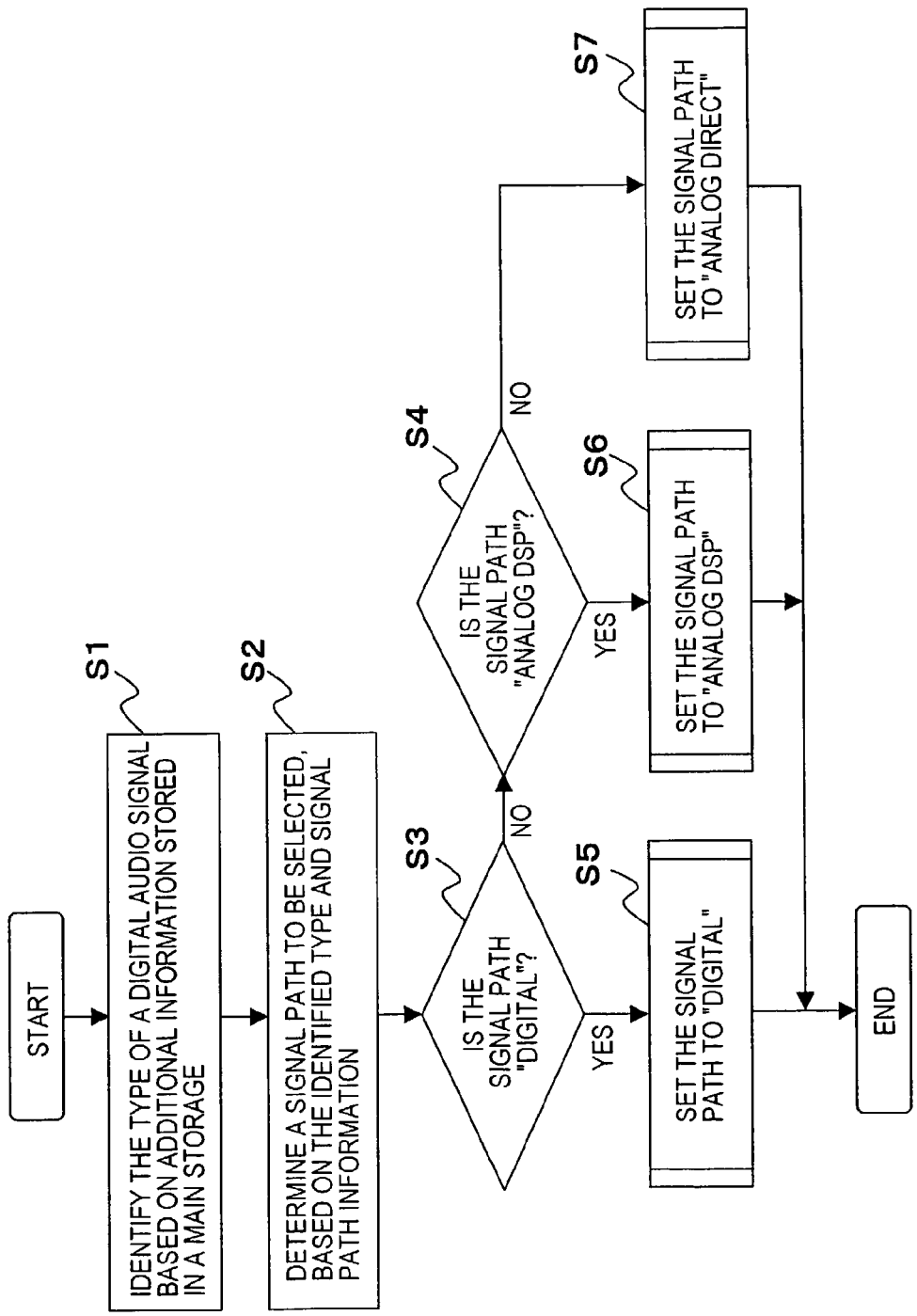

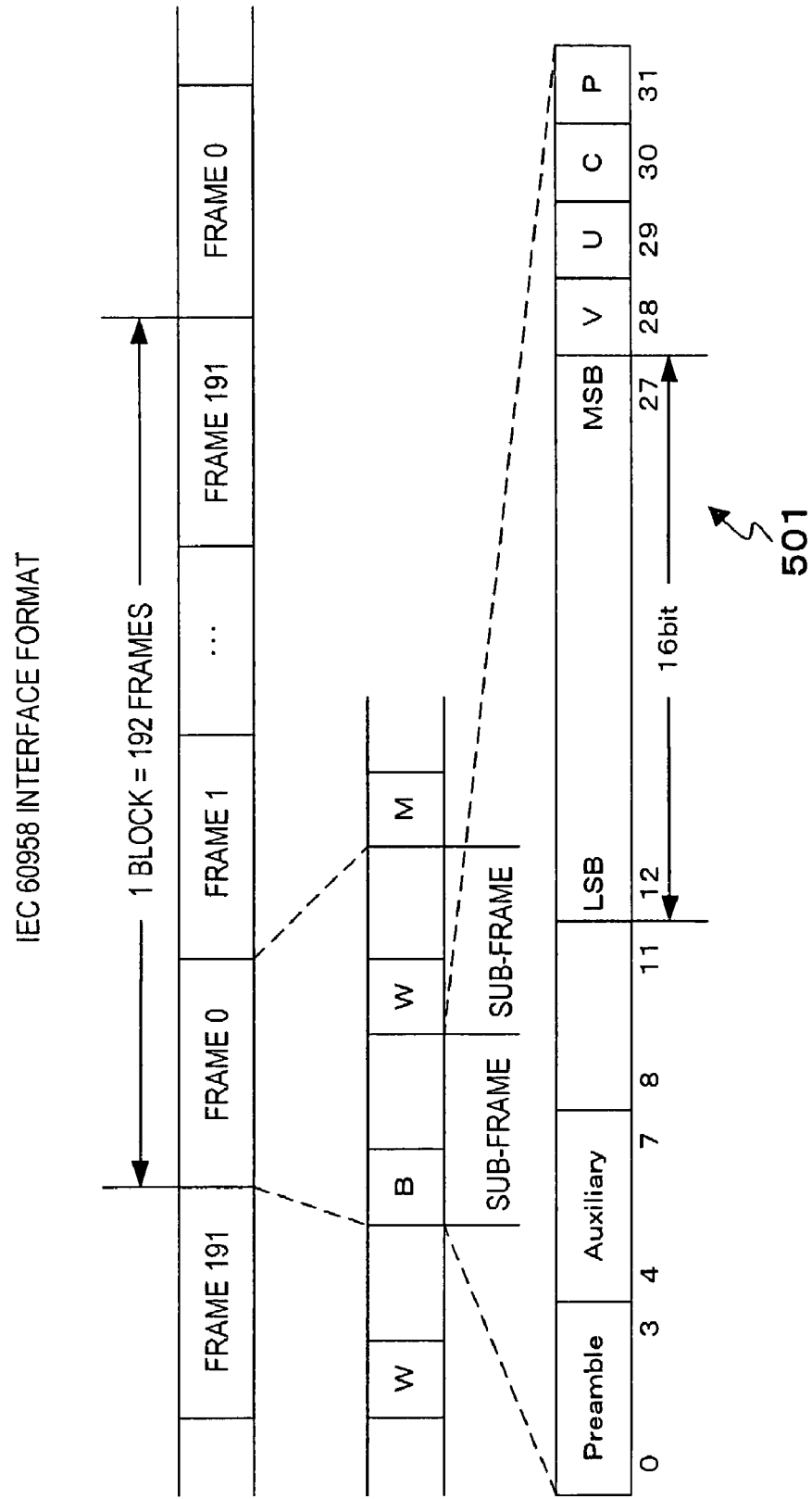

DATA-BURST FORMAT

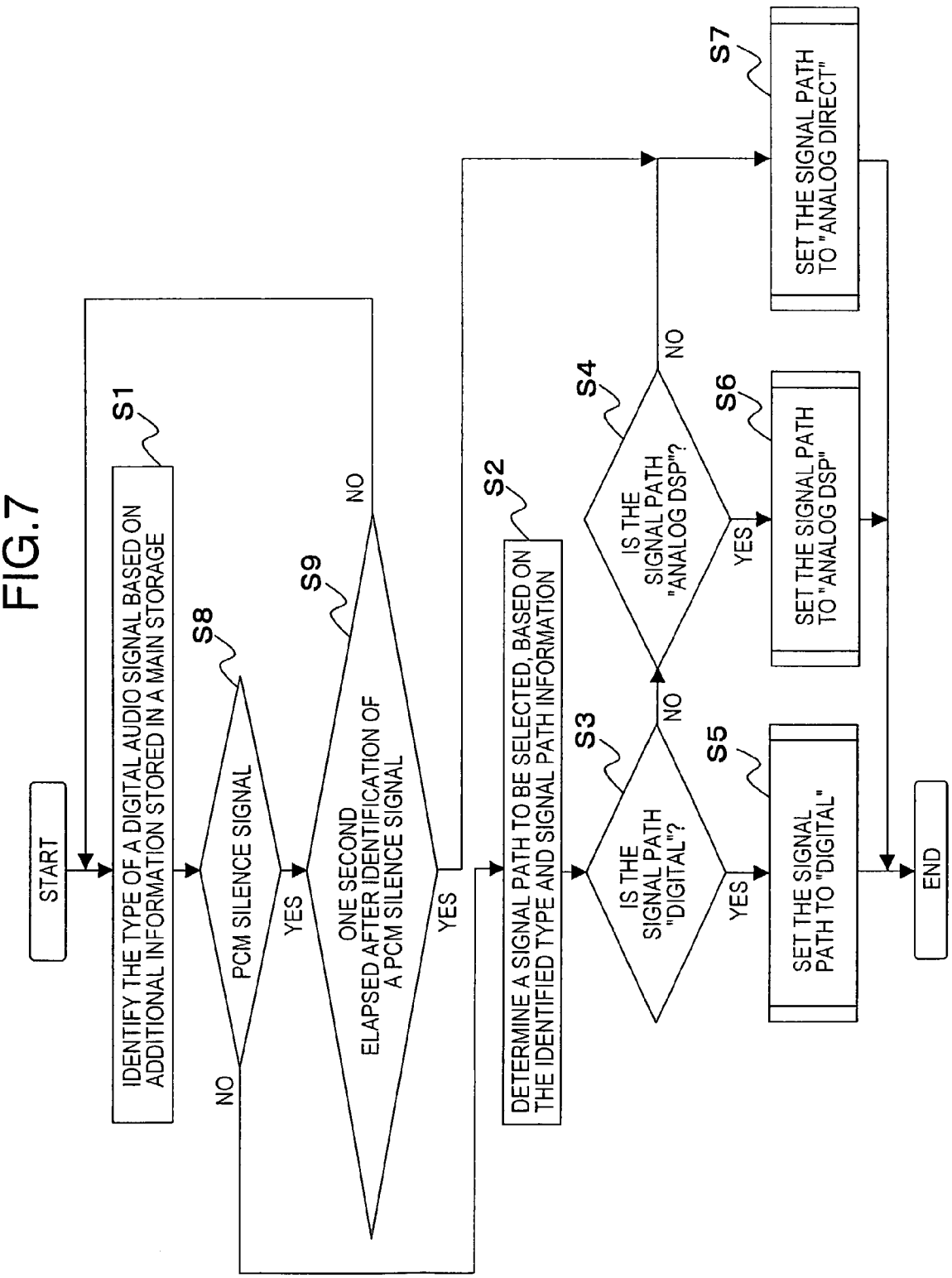

AUDIO REPRODUCING APPARATUS

BACKGROUND OF THE INVENTION

This invention relates to internal signal path selecting techniques used in an audio reproducing apparatus. More particularly, the invention relates to suitable techniques for selecting one of an analog audio signal and a digital audio signal as an audio signal to be outputted from an AV (Audio Visual) control amplifier in a case where, for example, one AV apparatus is connected to the AV control amplifier so that both an analog audio signal and a digital audio signal are inputted from the AV apparatus into an analog input terminal and a digital input terminal respectively of the AV control amplifier.

AV apparatus, such as a DVD player, a video tape recorder and a TV receiver with built-in BS digital tuner configured so that both an analog audio signal and a digital audio signal can be outputted therefrom are being spread. Therefore, a recent AV control amplifier is provided with both an analog input terminal and a digital input terminal respectively. When both an analog audio signal and a digital audio signal are inputted from an AV apparatus into the analog input terminal and the digital input terminal respectively, a signal path corresponding to the analog audio signal or a signal path corresponding to the digital audio signal is selected, and an audio signal transmitted through the selected signal path is reproduced and outputted.

For example, a case where the AV apparatus is a TV receiver with built-in BS digital tuner will be discussed. At present, the TV broadcasts include a terrestrial broadcast, a BS analog broadcast and a BS digital broadcast.

In a BS digital broadcast, a video signal is changed from a video signal of an analog system adopted in a BS analog broadcast to a video signal of a MPEG-2 system, which is a digital compression system, and an audio signal is changed from a digital PCM (Pulse Code Modulation) signal adopted in a BS analog system to a MPEG2 AAC (MPEG2 Advanced Audio Coding) signal, which is a signal of a digital audio compression system. The MPEG2 AAC can transmit a multi-channel audio signal in a compressed state. Therefore, unlike a 2-channel reproduction of a digital PCM signal in a BS analog broadcast, an audio reproduction having a full of realism can be obtained in a motion picture and the like.

Since a BS digital broadcast has been started, and a BS analog broadcast is scheduled to terminate the service, a case where a terrestrial broadcast and a BS digital broadcast are handled as TV broadcasts will be described.

In order to receive a terrestrial broadcast and a BS digital broadcast to reproduce a video signal and an audio signal, it is necessary to use a so-called TV receiver with built-in BS digital tuner in which a tuner for a BS digital broadcast is built-in tuner together with a tuner for a terrestrial broadcast.

When receiving a terrestrial broadcast, TV receiver with built-in BS digital tuner receives the broadcasting waves by the tuner for terrestrial broadcast and demodulates the same, and then displays the motion picture corresponding to the video signal thus-obtained on a TV screen. The audio signal is outputted from built-in loudspeakers, or from the loudspeakers connected to an AV control amplifier whose analog input terminal is connected to an analog output terminal of the TV receiver.

When receiving a BS digital broadcast, the TV receiver with built-in BS digital tuner receives the BS digital broadcasting waves and demodulates the same by the tuner for BS digital broadcast, and displays the motion picture corresponding to the video signal thus-obtained on a TV screen. The audio signal is outputted from a built-in 2-channel loudspeakers, or from loudspeakers connected to the AV control amplifier whose digital input terminal is connected to digital output terminal of the TV receiver. The audio signal outputted from the digital output terminal of the TV receiver with built-in BS digital tuner is a MPEG2 AAC signal. Therefore, the AV control amplifier connected to the TV receiver with built-in BS digital tuner is necessary to be an AV control amplifier capable of decoding the MPEG2 AAC signal. The AV control amplifier decodes the MPEG2 AAC signal outputted from the TV receiver with built-in BS digital tuner, and outputs a multi-channel audio signal thus-obtained, from the loudspeakers connected to this AV control amplifier.

In order to make the AV control amplifier operate the audio signal thus outputted from the TV receiver with built-in BS digital tuner supporting both a terrestrial broadcast and BS digital broadcast, it is necessary to provide both an analog input terminal and a digital input terminal on the AV control amplifier to which both an analog output terminal and a digital output terminal of the TV receiver with built-in BS digital tuner are connected respectively. It is also necessary to switch the internal signal path in the AV control amplifier in accordance with a decision whether to reproduce and output an analog audio signal for a terrestrial broadcast inputted into the analog input terminal, or to reproduce and output an MPEG2 AAC signal for a BS digital broadcast inputted from the digital input terminal.

A first method of selecting a signal path in an AV control amplifier is disclosed in JP-A-11-289594. In this method, a user is made to select between a signal path corresponding to an analog audio signal and a signal path corresponding to a digital audio signal, and to input the selection through an operating unit of an AV control amplifier into a certain AV apparatus, and inputted selection is stored in the AV control amplifier. In order to reproduce and output an audio signal from the same AV apparatus, a signal path is always selected in accordance with the inputted selection stored in the AV control amplifier.

Another method of selecting a signal path in an AV control amplifier is the following method. Namely, in the case where both an analog input terminal and a digital input terminal provided for an AV control amplifier are connected to an analog output terminal and a digital output terminal of the same (one) AV apparatus respectively, when a digital audio signal is inputted into the digital input terminal, this digital audio signal is subjected to DA conversion by a digital to analog (DA) converter in the AV control amplifier irrespective of the condition of the analog input terminal. An analog audio signal thus obtained is outputted from loudspeakers connected to this AV control amplifier.

In this second method, a digital audio signal inputted from the digital input terminal is preferentially outputted. This is based on a general view that an audio signal obtained from a digital audio signal is less influenced by a transmission path than an audio signal obtained from an analog audio signal, and has a higher sound quality.

A third method of selecting a signal path in an AV control amplifier is disclosed in JP-A-2000-331431. In this method, an AV control amplifier receives information indicating the type of a digital audio signal from a DVD player, and switches an input system according to the received information. Namely, the DVD player (audio reproducing unit) identifies the type of a digital audio signal, which is recorded on the DVD, based on the data recorded thereon, and transmits information indicating the identified type of digital audio signal to an AV control amplifier (amplifier unit) through a transmission-reception unit. The AV control amplifier then determines based on the information indicating the type of digital audio signal received from the DVD player whether or not the digital audio signal inputted from the DVD player thereinto is a digital audio signal capable of being decoded by the AV control amplifier itself. Consequently, when the digital audio signal is determined as decodable digital audio signal, a signal path is switched so as to make AV control amplifier decode the digital audio signal inputted from the DVD player and output the signal thus-obtained. When the digital audio signal is determined as a non-decodable digital audio signal, the signal path is switched so as to make AV control amplifier output the analog audio signal inputted from the DVD player.

SUMMARY OF THE INVENTION

According to the above-described first method, when a signal path corresponding to an analog audio signal from the AV apparatus is selected, and when a digital audio signal which can be performed DA conversion not in the AV apparatus but in the AV control amplifier is inputted into the digital input terminal of the AV control amplifier, the user has to input an instruction of selecting a signal path corresponding to the inputted digital audio signal, into the AV control amplifier through the operating unit thereof so as to switch the signal path to be adopted by the AV control amplifier.

For example, when a mode of a TV receiver with built-in BS digital tuner is switched from a mode of receiving a terrestrial broadcast to that of receiving a BS digital broadcast, in a case where a signal path corresponding to an analog audio signal from the TV receiver with built-in BS digital tuner is selected in the AV control amplifier, a MPEG2 AAC signal of the BS digital broadcast is inputted into a digital input terminal of this AV control amplifier. In order to reproduce this signal in the AV control amplifier and output the resultant signal therefrom, the user has to input an instruction a signal path corresponding to the MPEG2 AAC signal into the AV control amplifier through the operating unit of the AV control amplifier.

On the other hand, according to the above-described second method, the signal path of the AV control amplifier can be switched from the signal path corresponding to an analog audio signal to the signal path corresponding to the digital audio signal without making a user operate the AV control amplifier.

However, in the second method, the digital audio signal from the AV apparatus is always selected preferentially. For example, in a case where the performance of the DA converter in the AV apparatus is superior to that of the DA converter integrated in the AV control amplifier, a better sound quality may be obtained from the DA conversion of a digital audio signal carried out in the AV apparatus than that obtained from the DA conversion carried out in the DA converter integrated in the AV control amplifier. For another example, in a case where the AV apparatus is provided with a DSP (Digital Signal Processor) which decodes a digital audio signal, and the decoding capacity of this DSP is superior to that of the DSP on the AV control amplifier, a higher sound quality may be obtained by decoding the digital audio signal with the AV apparatus than that of obtained by decoding with the DSP on the AV control amplifier.

In such a case, the signal path corresponding to a digital audio signal is preferentially selected in the second method.

Therefore, it is necessary for a user to input an instruction of selecting a signal path corresponding to an analog audio signal into the AV control amplifier through the operating unit of the AV control amplifier by the above-described first method.

For example, while a TV receiver with built-in BS digital tuner receives a terrestrial broadcast, a PCM silence signal is outputted from the digital output terminal of the mentioned TV receiver since the terrestrial broadcasting is an analog audio signal. In this case, when the AV control amplifier adopts the above-described second method, a PCM silence signal from the digital input terminal is reproduced and outputted since the input signal into the digital input terminal is preferentially reproduced and outputted. Therefore, it is necessary for a user to input an instruction of selecting a signal path corresponding to the analog audio signal outputted from the TV receiver with built-in BS digital tuner, into the AV control amplifier through the operating unit thereof by the above-described first method.

When, according to the above-described third method, the AV control amplifier receives a digital audio signal capable of being decoded thereby from the AV apparatus (DVD player), this AV control amplifier decodes the inputted digital audio signal, and outputs the resultant signal after DA conversion. However, when the performance of the DA converter of the DVD player is higher than that of the DA converter integrated in AV control amplifier, better sound quality may be obtained by DA conversion in the DVD player than that obtained by DA conversion integrated in the AV control amplifier. Even in this case, an analog audio signal obtained by DA conversion performed in the DA converter integrated in the AV control amplifier is outputted from the AV control amplifier. Therefore, it is necessary for a user to input an instruction of selecting a signal path corresponding to the analog audio signal outputted from the DVD player into the AV control amplifier through the operating unit thereof by the above-mentioned first method.

According to the above-described third method, it is assumed that both the AV apparatus (DVD player) and AV control amplifier are provided with transmission-reception units for transmitting and receiving information indicating a type of digital audio signal. When the AV apparatus other than such an AV apparatus is connected to the AV control amplifier, the AV control amplifier cannot receive the information indicating the type of the digital audio signal therefrom. Therefore, the automatic switching of the signal path cannot be done. For example, the AV control amplifier cannot recognize that a mode in the TV receiver with built-in BS digital tuner is switched from that of receiving a BS digital broadcast to that of receiving a terrestrial broadcast in a case where a signal path corresponding to a digital audio signal from the TV receiver with built-in BS digital tuner, so that a PCM silence signal from the digital input terminal is reproduced and outputted.

Therefore, it is necessary for the user to input an intention of selecting a signal path corresponding to the analog audio signal to be outputted from the TV receiver with built-in BS digital tuner, into the AV control amplifier through the operating unit thereof by the above-described first method.

The object of the present invention is to solve these problems, and to provide an audio reproducing apparatus adapted to identify the type of an inputted digital audio signal, and automatically switch an internal signal path based on the results of the identification operation. The invention also provides an audio reproducing apparatus adapted to switch a signal path corresponding to an analog audio signal when the digital audio signal to be inputted is a PCM silence signal, and thereby prevent the PCM silence signal from being reproduced and outputted.

The invention further provides so as to solve the mentioned problems an audio reproducing apparatus having an analog input terminal to which an analog audio signal outputted from an AV apparatus is inputted, and a digital input terminal to which a digital audio signal outputted from the AV apparatus is inputted, the apparatus being provided with a storage means for storing signal path information indicating an inner signal path, for each type of the digital audio signals inputted from the AV apparatus through the digital input terminals, an identification means for identifying the type of the digital audio signal based on additional information on the digital audio signal inputted into the digital input terminal, and a switch means for switching the internal signal path based on the signal path information stored in the storage correspondingly to the type of digital audio signal identified by the identification means.

The signal path information stored in the storage means may be designed so as to be set in advance by the user. The signal path information includes, for example, signal path information indicating a signal path for processing a digital audio signal inputted from the digital input terminal and outputting the resultant signal therefrom, signal path information indicating a signal path for processing an analog audio signal inputted from the analog input terminal and outputting the resultant signal therefrom, and signal path information indicating a signal path for outputting an analog audio signal inputted from the analog input terminal without being processed.

According to this invention, the signal path is automatically switched in accordance with the type of the digital audio signal inputted from the AV apparatus, owing to the above-described configuration. Therefore, it becomes unnecessary for the user to operate switching the signal path by himself.

The present invention still further provides so as to solve the mentioned problems an audio reproducing apparatus having an analog input terminal to which an analog audio signal outputted from an AV apparatus is inputted, and a digital input terminal to which a digital audio signal outputted from the AV apparatus is inputted, the apparatus being provided with an identification means for identifying the type of a digital audio signal inputted into the digital input terminal, based on additional information on the same digital audio signal, and a switch means for switching the internal signal path to another so as to reproduce the analog audio signal inputted from the analog input terminal and output the resultant signal when the results of the identification operation carried out by the identification means show that the type of the digital audio signal inputted from the digital input terminal is PCM silence signal, and that the PCM silence signal continues to be inputted for a predetermined period of time; and switching the internal signal path so as to reproduce the digital audio signal inputted from the digital input terminal and output the resultant signal when the results of the mentioned identification operation show otherwise.

According to this invention in the above configuration, for example, in the case where the analog input terminal and the digital input terminal of the audio reproducing apparatus are connected to the analog output terminal and the digital output terminal of the TV receiver with built-in BS digital tuner respectively, and where a mode in the TV receiver is switched from that of receiving a BS digital broadcast to that of receiving a terrestrial broadcast, the MPEG2 AAC signal theretofore inputted into the digital input terminal is switched to a PCM silence signal, and, accordingly, the signal path is automatically switched to a signal path corresponding to the analog audio signal. Therefore, the analog audio signal for a terrestrial broadcast is reproduced and outputted, and the reproducing and outputting of the PCM silence signal can be prevented.

When the mode in TV receiver with built-in BS digital tuner is thereafter switched from that of receiving a terrestrial broadcast to that of receiving a BS digital broadcast, the PCM silence signal theretofore inputted into the digital input terminal is switched to a MPEG2 AAC signal, and, accordingly, the signal path is automatically switched to a signal path corresponding to a digital audio signal. Therefore, a digital audio signal (MPEG2 AAC signal) for a BS digital broadcast is reproduced and outputted.

Accordingly, it becomes unnecessary for the user to operate the AV control amplifier every time the TV receiver with built-in BS digital tuner switches a broadcast receiving mode.

BRIEF DESCRIPTION OF THE DRAWINGS

FIG. 2 is a diagram showing a screen display example of a signal path selection menu for the AV control amplifier to which the first embodiment of the present invention is applied;

FIG. 3 is a diagram for describing a stored example of signal path information for the AV control amplifier to which the first embodiment of the present invention is applied;

FIG. 4 is a flow chart for describing a signal path switching procedure of the AV control amplifier to which the first embodiment of the present invention is applied;

FIG. 5 is a diagram for describing an IEC-60958 interface format;

FIG. 7 is a flow chart for describing a signal path switching procedure of the AV control amplifier to which a second embodiment of the present invention is applied.

DESCRIPTION OF THE PREFERRED EMBODIMENT

A first embodiment of the present invention will be described with reference to the drawings.

Figure 1:
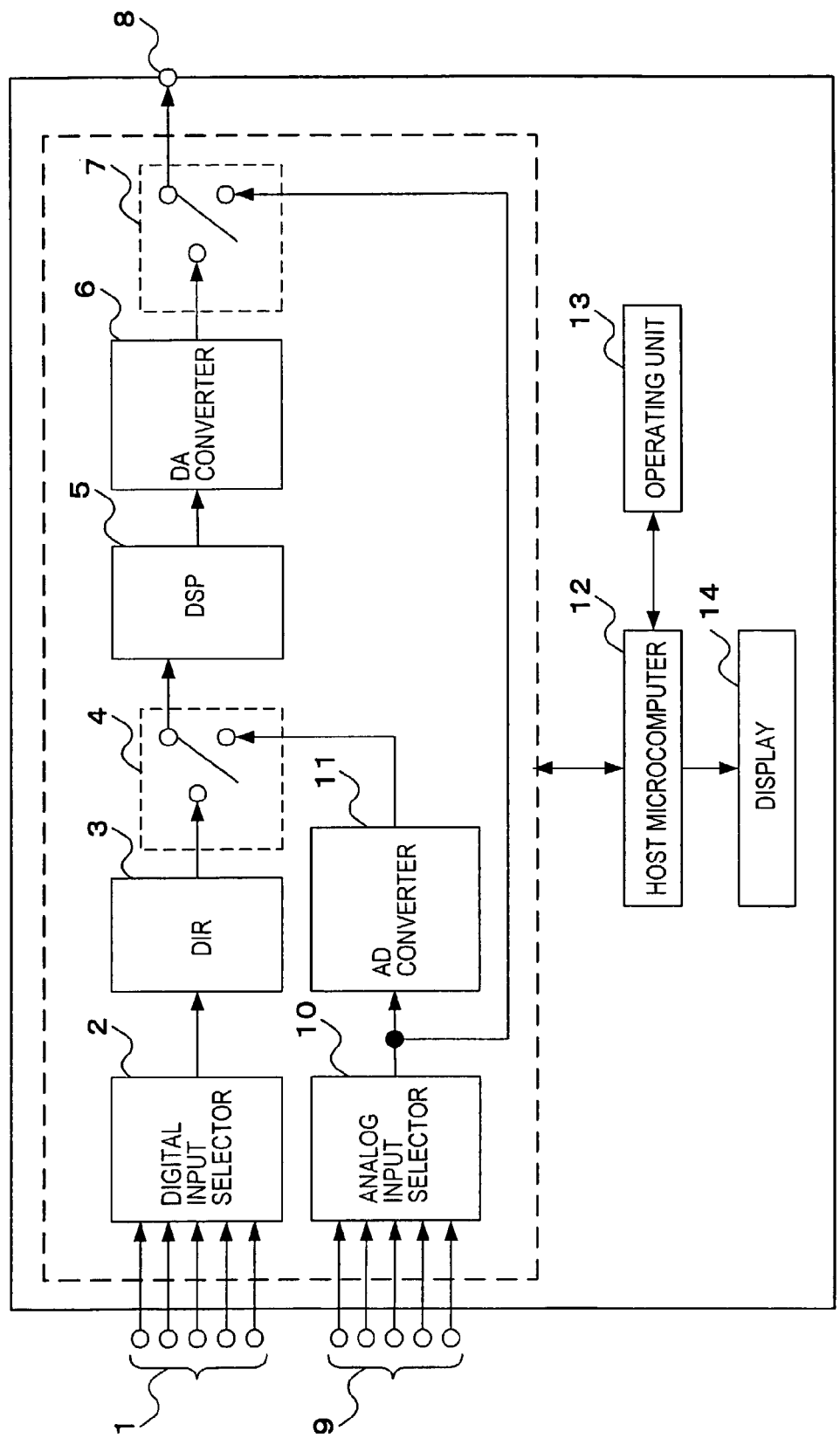
FIG. 1 is a diagram showing a schematic configuration of an AV control amplifier to which a first embodiment of the present invention is applied.

FIG. 1 is a diagram showing a schematic configuration of an AV control amplifier to which the first embodiment of the present invention is applied.

As shown in the drawing, the AV control amplifier in this embodiment has a digital input unit 1, a digital input selector 2, a DIR (Digital Interface Receiver) 3, an analog or digital (A/D) switching selector 4, a DSP (Digital Signal Processor) 5, a digital-to-analog (DA) converter 6, an analog direct or DSP process switching selector 7, an analog output unit 8, an analog input unit 9, an analog input selector 10, an analog-to-digital (AD) converter 11, a host microcomputer (microcomputer unit) 12, an operating unit 13 and a display 14.

In the AV control amplifier of the above-described configuration, a digital audio signal outputted from an external AV apparatus, such as a DVD player and a video tape recorder is inputted into the digital input unit 1. This digital input unit 1 is provided with a plurality of digital input terminals through which digital audio signals are inputted from a plurality of external AV apparatuses. In accordance with an instruction from the host microcomputer 12, a digital audio signal selected by the digital input selector 2 is sent to the DIR 3.

In the DIR 3, the inputted digital audio signal modulated in accordance with a bi-phase mark protocol is demodulated. Then, the additional information (including sampling, emphasis and preamble information) sent with the digital audio signal is extracted.

The digital audio signal demodulated in the DIR 3 is sent to the A/D switching selector 4. In the A/D switching selector 4, a digital input terminal is selected in accordance with an instruction from the host microcomputer 12, and the digital audio signal whose interface is converted is sent to the DSP 5.

The additional information extracted in the DIR 3 is sent to the host microcomputer 12, and stored in a main storage unit therein.

The host microcomputer 12 identifies the type of the digital audio signal based on the additional information on the digital audio signals stored in the main storage unit, determines decoding software corresponding to this digital audio signal based on the results of the identification operation, and sets the determined decoding software to the DSP 5.

The digital audio signals processed in the AV control amplifier in this embodiment include bit streams of a PCM audio signal and a non-PCM audio signal. The bit streams of a non-PCM audio signal include DOLBY DIGITAL (registered trademark) (which is hereinafter shown as "DOLBY DIGITAL". In FIGS. 2 and 3, the "DOLBY DIGITAL" is a registered trademark.), DTS (registered trademark)(which is hereinafter shown as "DTS". In to FIGS. 2 and 3, "DTS" is a registered trademark.), MPEG2 AAC and so on. Since the bit streams are compressed data, they have to be decoded. However, the bit stream data have a plurality of types of data as shown above. Therefore, in the host microcomputer 12, the type of digital audio signal is identified, and the decoding software to be set to the DSP 5 is determined in accordance with the results of the identification operation.

The DSP 5 decodes the digital audio signal using the decoding software set in the host microcomputer 12, and sends the decoded digital audio signal to the DA converter 6.

The DA converter 6 converts the decoded digital audio signal into an analog audio signal, and sends the converted analog audio signal to the analog direct/DSP process switching selector 7.

The analog direct/DSP process switching selector 7 selects the DSP process side in accordance with an instruction from the host microcomputer 12, and outputs the analog audio signal obtained by DA-conversion in the DA converter 6 from the analog output unit 8. The analog output unit 8 is usually connected to loudspeakers (not shown).

In the AV control amplifier of the above-described configuration, the analog audio signal outputted from the external AV apparatus is inputted into the analog input unit 9. The analog input unit 9 is provided with a plurality of analog input terminals, through which an analog audio signal is inputted from a plurality of external AV apparatuses. The analog audio signal selected by the analog input selector 10 in accordance with an instruction from the host microcomputer 12 is sent to the AD converter 11 and the analog direct/DSP process switching selector 7.

When it is necessary to add a sound effect in the AV control amplifier to the analog audio signal selected in the analog input selector 10, the host microcomputer 12 switches the A/D switching selector 4 to the analog input side, and the analog direct/DSP process switching selector 7 to the DSP process side. The analog audio signal thereby selected in the analog input selector 10 converted in the AD converter 11, and a sound effect is thereafter added to the resultant signal in the DSP 5. The signal is then subjected to DA conversion in the DA converter 6, so as to output from the analog output unit 8.

When it is not necessary to add a sound effect in the AV control amplifier to the analog audio signal selected in the analog input selector 10, the host microcomputer 12 switches the A/D switching selector 4 to the analog input side, and the analog direct/DSP process switching selector 7 to the analog direct side. As a result, the analog audio signal selected in the analog input selector 10 is outputted from the analog output unit 8 without being processed.

In this embodiment, the signal paths in the AV control amplifier include three types of signal paths, i.e. a signal path for a digital audio signal, a signal path for an analog audio signal with processing a sound effect, and a signal path for an analog audio signal without any processing. These signal paths shall be called "digital" signal path, "analog DSP" signal path and "analog direct" signal path, respectively.

A signal path switching operation in the AV control amplifier in this embodiment is now described with reference to FIGS. 2 to 4.

As described above, in the AV control amplifier in this embodiment, the host microcomputer 12 gives instructions concerning objective signal paths to the A/D switching selector 4 and analog direct/DSP process switching selector 7, and thereby makes these selectors select one of "digital" signal path, "analog DSP" signal path and "analog direct" signal path.

Namely, when the host microcomputer 12 selects "digital" signal path, the microcomputer 12 switches the A/D switching selector 4 to the digital input side, and the analog direct/DSP process switching selector 7 to the DSP process side. When the host microcomputer 12 selects the "analog DSP" signal path, the host microcomputer 12 switches the A/D switching selector 4 to the analog side, and the analog direct/DSP process switching selector 7 to the DSP process side. When the host microcomputer 12 selects the "analog direct" signal path, the host microcomputer 12 switches the A/D switching selector 4 to the analog side, and the analog direct/DSP process switching selector 7 to the analog direct side.

The host microcomputer 12 selects one among "digital" signal path, "analog DSP" signal path and "analog direct" signal path in accordance with the predetermined signal path information set by the user.

Namely, the signal path information received from the user through the operating unit 13 is stored in the main storage unit in the host microcomputer 12. The host microcomputer 12 selects a signal path based on the signal path information stored in the main storage unit.

Here, the reception procedure of the user's inputting operation of signal path information will be described.

The user can designate a signal path for each type of digital audio signal inputted from an external AV apparatus, in the signal path selection menu as shown on the display 14 in FIG. 2 through the operating unit 13.

The signal path selection menu is prepared for each external AV apparatus connectable to the AV control amplifier. In the example of FIG. 2, the signal path selection menu being used, when the user designates a DVD player as an external AV apparatus through the operating unit 13 is shown. In this example, the user designates signal paths to be selected in the following manner. Namely, when a PCM signal is inputted from the DVD player into the AV control amplifier, "analog direct" signal path is selected. When a DOLBY DIGITAL signal is inputted from the DVD player, "analog DSP" signal path is selected. When a DTS signal is inputted from the DVD player, "digital" signal path is selected. When a MPEG2 AAC signal is inputted from the DVD player, a "digital" signal path is selected. When other non-corresponding signal is inputted from the DVD player, an "analog direct" signal path is selected.

The signal path information designated by the user is sent to the host microcomputer 12, and, for example, stored in the main storage in the host microcomputer 12 corresponding to the type of digital audio signals by each external AV apparatuses as shown in FIG. 3. The host microcomputer 12 switches the signal path based on the signal path information thus stored in the main storage unit in the interior thereof.

As described above, the additional information extracted in the DIR 3 besides the signal path information is also stored in the main storage unit of the host microcomputer 12.

As shown in FIG. 4, the host microcomputer 12 first identifies the type of a digital audio signal inputted thereto from the digital input unit 1 through the digital input selector 2, based on the additional information stored in the storage (Step S1). The types of such a signal referred to above include PCM, DOLBY DIGITAL, DTS, MPEG2 AAC and so on.

A method of identifying the type of a digital audio signal by the host microcomputer 12 is now described.

As shown in FIG. 5, a digital audio signal inputted into the DIR 3 has an interface format according to the digital audio interface standards (IEC-60958), and coded digital audio signals are stored in a section 501 of bits 27 to 12 of FIG. 5.

Figure 6:
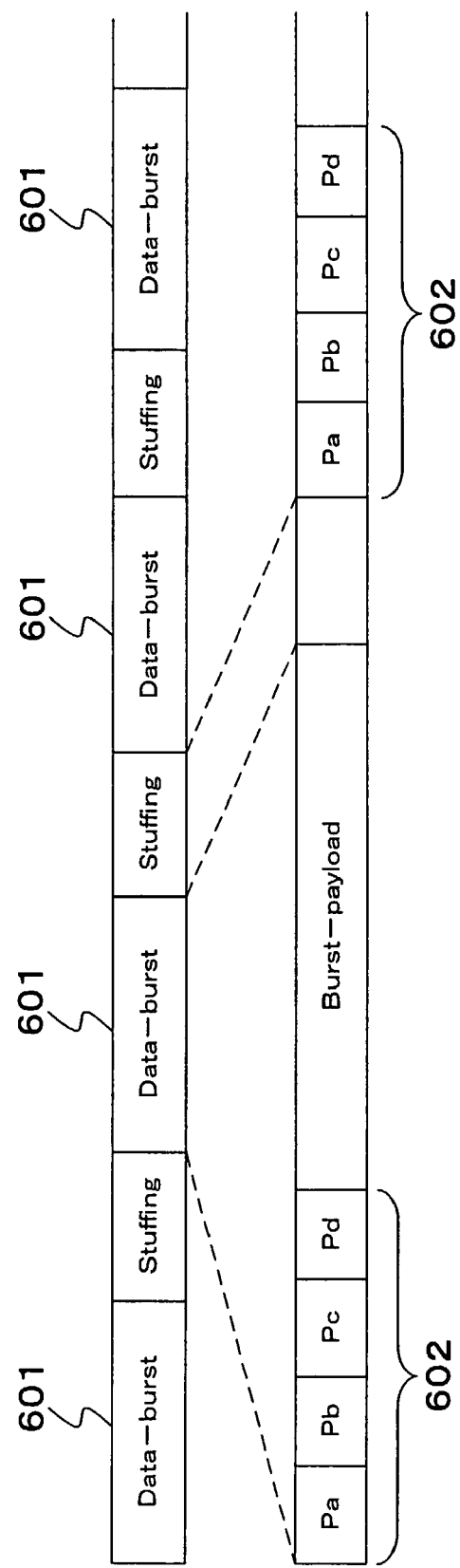
FIG. 6 is a diagram for describing a data-burst format.

The coded digital audio signals include bit streams of PCM audio signals and non-PCM audio signals. The bit streams are arranged in a section 501 of bits 27 to 12 of FIG. 5 in such a data-burst format as shown in FIG. 6 in accordance with the standards (IEC-61937) applying the bit streams to IEC-60958 interface. At a front end of each data-burst 601, a preamble (Pa, Pb, Pc, Pd) 602 each having 16 bits (64 bits in total) is added. The Pa and Pb denote synchronous codes, Pc denotes information on the data-burst, and Pd denotes the length of the data-burst.

In order to identify a digital audio signal transmitted based on IEC-60958 as bit streams of PCM audio signal or as bit streams of non-PCM audio signal, a sub-frame of IEC-60958 may be checked as to whether a preamble (Pa, Pb, Pc, Pd) exists therein. When a preamble exists, the digital audio signal can be judged to be a bit stream of a non-PCM audio signal, and, when a preamble does not exist, the digital audio signal can be judged to be bit streams of PCM audio signal.

When a preamble (Pa, Pb, Pc, Pd) does not exist in a sub-frame of IEC-60958 at the same time with all of the bits 27 to 12 in the sub-frame of IEC-60958 being zero, the digital audio signal can be judged to be a PCM silence signal.

When the mentioned digital audio signal is thus judged to be a bit stream of a non-PCM audio signal, the type of the bit stream thereof can be identified by checking a data type recorded in bits 4 to 0 of the preamble Pc. Namely, the digital audio signal as a MPEG2 AAC signal for a BS digital broadcast or not, as a DOLBY DIGITAL signal or not, and as a DTS signal or not can be identified by checking a data type of Pc when the digital audio signal is identified as a bit stream of non-PCM audio signal.

Returning to FIG. 4, the description will be continued. The host microcomputer 12 then determines a signal path to be selected, based on the result of the identification operation in Step S1 and the signal path information stored in the storage (Step S2). For example, following the example shown in FIG. 2 when the host microcomputer 12 identifies the type of the digital audio signal inputted thereto from a DVD player as a PCM signal, the host microcomputer 12 decides that a signal path to be selected is "analog direct" signal path.

The host microcomputer 12 then judges whether the decided signal path is "digital" signal path or not (Step S3).

When the decided signal path is "digital" signal path, the host microcomputer 12 sets the signal path of the AV control amplifier to "digital" signal path (Step S5) and finishes the signal path switching procedure. Namely, as described above, the A/D switching selector 4 is switched to the digital side, and the analog direct/DSP process switching selector 7 to the DSP processing side.

When the decided signal path is not "digital" signal path, the host microcomputer 12 judges whether the decided signal path is "analog DSP" signal path or not (Step S4).

When the decided signal path is "analog DSP" signal path, the host microcomputer 12 sets the signal path of the AV control amplifier to "analog DSP" signal path (Step S6) and finishes the signal path switching procedure. Namely, as described above, the A/D switching selector 4 is switched to the analog side, and the analog direct/DSP process switching selector 7 to the DSP processing side.

When the decided signal path is not "analog DSP" signal path, it means that the signal path is decided as "analog direct" signal path. Therefore, the host microcomputer 12 sets the signal path of the AV control amplifier to "analog direct" signal path (Step S7) and finishes the signal path switching procedure. Namely, as described above, the host microcomputer 12 switches the A/D switching selector 4 to the analog side, and the analog direct/DSP process switching selector 7 to the analog direct side.

The first embodiment of the present invention has been described above. According to the AV control amplifier in this embodiment, the signal path can be automatically switched so that a signal path designated by the user in advance for each type of inputted digital audio signal is selected. This enables the user to obtain a desired audio reproduction at all times.

For example, a case where a DVD player provided with a DA converter whose performance is superior to that of the DA converter 6 of the AV control amplifier in this embodiment is connected thereto will be described.

When a DVD player reproduces DVD corresponding to DTS, a digital audio signal of a DTS signal and an analog audio signal obtained by subjecting the DTS signal to DA conversion are inputted from this DVD player into the digital input unit 1 and the analog input unit 9 respectively of the AV control amplifier in this embodiment.

In the AV control amplifier in this embodiment, the type of digital audio signal inputted from the digital input unit 1 thereof is identified as a DTS signal. According to the example shown in FIG. 2, a signal path to be selected is decided as "digital" signal path. As a result, the DTS signal outputted from the DVD player is decoded in the DSP 5, subjected to DA conversion in the DA converter 6, and then outputted from the analog output unit 8.

When the DVD player reproduces a CD, a digital audio signal of a PCM signal and an analog audio signal obtained by performing DA conversion to a PCM signal are inputted from the DVD player into the digital input unit 1 and analog input unit 9 respectively of the AV control amplifier in this embodiment.

In the AV control amplifier in this embodiment, the type of the digital audio signal inputted from the digital input unit 1 is identified as a PCM signal. According to the example shown in FIG. 2, a signal path to be selected is decided as "analog direct" signal path. As a result, the analog audio signal outputted from the DVD player is outputted without being processed from the analog output unit 8.

Thus, when a sound quality attained in a case where an analog audio signal obtained by performing DA conversion to a PCM signal in the DVD player is outputted from the AV control amplifier is higher than that attained in a case where a PCM signal is subjected to DA conversion in the DA converter 6 in the AV control amplifier in this embodiment, the user may designate the signal path information corresponding to the PCM signal as "analog direct" in this DVD player as shown in the example of FIG. 2. Consequently, the "analog direct" is selected whenever a CD is reproduced by this DVD player, so that a desired audio reproduction can be obtained.

Also, when a digital audio signal outputted from the DVD player is DOLBY DIGITAL signal, for example, the user usually designates "digital" signal path as a signal path to be selected so that this DOLBY DIGITAL signal is decoded in the DSP 5, subjected to DA conversion in the DA converter 6, and thereafter outputted from the analog output unit 8. However, for example, when the user desires to add a sound effect in the AV control amplifier in this embodiment to an analog audio signal obtained by decoding a DOLBY DIGITAL signal and subjecting the resultant signal to DA conversion in the DVD player, he can designate a signal path corresponding to the DOLBY DIGITAL signal as "analog DSP" signal path as shown in the example of FIG. 2.

Thus, the analog audio signal obtained by decoding DOLBY DIGITAL signal and performing DA conversion to the signal thus-obtained in the DVD player can be subjected to AD conversion in the AD converter 11, decoded in the DSP 5, subjected to DA conversion in the DA converter 6, and thereafter outputted from the analog output unit 8.

A second embodiment of the present invention is now described.

A schematic configuration of an AV control amplifier in this embodiment is identical with that of the AV control amplifier in the first embodiment shown in FIG. 1. However, any of digital input terminals of the digital input unit 1 and any of analog input terminals of the analog input unit 9 are connected to an analog output terminal and a digital output terminal of a TV receiver with built-in BS digital tuner (not shown) via cables so that a digital audio signal and an analog audio signal outputted from this TV receiver are inputted into the mentioned input terminals respectively.

A signal path switching operation for the AV control amplifier in the second embodiment is basically identical with that for the AV control amplifier in the first embodiment.

Namely, the host microcomputer 12 gives instructions concerning an object signal path to the AD switching selector 4 and the analog direct/DSP process switching selector 7 in accordance with the type of a digital audio signal inputted into the DIR 3, and selects one of "digital", "analog" and "analog direct" signal paths.

When the result of an operation for identifying the type of a digital audio signal shows that the digital audio signal is a PCM silence signal, an internal clock (not shown) of the host microcomputer 12 measures the time. During this time, the additional information stored in the main storage unit of the host microcomputer 12 is updated by the DIR 3 every time the additional information appears in the digital audio signal inputted from the digital input unit 1. The host microcomputer 12 identifies the type of a digital audio signal every time the additional information is updated.

When a predetermined period of time (one second in this embodiment) has elapsed after the measurement operation started to identify that PCM silence signal is being inputted, the host microcomputer 12 selects "analog direct" signal path so as to reproduce and output an analog audio signal inputted from an analog input unit 9. The measurement time of one second mentioned above is the time provided so that, when a program channel is switched during the reception of the BS digital broadcast with the TV receiver with built-in BS digital tuner, the signal path is not switched according to the PCM silence signal outputted from the digital audio output terminal. The user can change the length of this measurement time by inputting a desired value through an operating unit 13 in accordance with instructions shown on the display 14.

In the AV control amplifier in this embodiment, even the type of audio signal inputted is identified as a PCM silence signal, if the type of a digital audio signal identified changes to other types during the one-second measurement operation (within a period of time shorter than one second), the signal path in the AV control amplifier is not switched to "analog direct" signal path because the PCM silence signal is identified. In short, the "digital" signal path remains as it is. Therefore, the occurrence of the switching of the signal path every time the user switches the BS digital broadcasting program can be prevented.

A flow chart of a procedure of a signal path switching operation in the AV control amplifier in this embodiment is shown in FIG. 7.

The flow chart shown in FIG. 7 differs from that of the procedure of an operation for switching a signal path in the AV control amplifier in the first embodiment shown in FIG. 4, in that Steps S8 and S9 are added between the Steps S1 and S2.

In Step S8, the host microcomputer 12 judges whether the result of an operation for identifying the type of a digital audio signal in Step S1 show that the digital audio signal is a PCM silence signal or not. When the digital audio signal is not identified as a PCM silence signal, the operation proceeds to Step S2. When the digital audio signal is identified as a PCM silence signal, the operation proceeds to Step S9.

In Step S9, the host microcomputer 12 judges whether a predetermined period of time (one second in this embodiment) has elapsed after identifying the type of the digital audio signal as a PCM silence signal. When a predetermined period of time did not elapse, the operation is returned to Step S1. When a predetermined period of time elapsed, the operation proceeds to Step S7, and "analog direct" signal path is selected.

The second embodiment has been described above. When, according to the AV control amplifier in this embodiment, the result of identifying the type of inputted digital audio signal shows as PCM silence signal and the PCM silence signal continues identified for more than the predetermined period of time, the signal path of the AV control amplifier is switched to "analog direct" signal path. Therefore, when a mode in the TV receiver with built-in BS digital tuner is switched from a mode of receiving a BS digital broadcast to that of receiving a terrestrial broadcast, not a PCM silence signal but an analog audio signal for the terrestrial broadcast is reproduced properly. When a mode in the TV receiver with built-in BS digital tuner is switched from a mode of receiving a terrestrial broadcast to that of receiving a BS digital broadcast, a digital audio signal (MPEG2 AAC signal) for the BS digital broadcast can be reproduced and outputted by switching the signal path of the AV control amplifier to "digital" signal path.

Therefore, it becomes unnecessary for the user to operate the AV control amplifier every time the broadcast receiving mode of the TV receiver with built-in BS digital tuner is switched, and a desired audio reproduction can be obtained at all times.

According to the audio reproducing apparatus of the present invention described above, the type of inputted digital audio signal is identified, and the internal signal path can be automatically switched based on the result of this identification operation. When the result of the identification operation shows that the inputted digital audio signal is a PCM silence signal, the reproduction and outputting of the PCM silence signal can be prevented by switching to a signal path corresponding to an analog audio signal.

What is claimed is:

1. An audio reproducing apparatus having an analog input terminal to which an analog audio signal outputted from an AV apparatus is inputted, and a digital input terminal to which a digital audio broadcasting signal outputted from the AV apparatus is inputted, comprising:

an identification means for identifying a type of the digital audio broadcasting signal inputted into the digital input terminal, based on additional information of the digital audio signal, and a signal path switching means for switching an internal signal path to an analog path so as to reproduce and output the analog audio signal inputted from the analog input terminal, when a result of an identification in the identification means shows that the digital audio broadcasting signal inputted from the digital input terminal is a PCM (Pulse Code Modulation) silence signal, and the PCM silence signal is inputted for more than a predetermined period of time and otherwise keeping the internal signal path so as to reproduce and output the digital audio broadcasting signal inputted from the digital input terminal.

2. An audio reproducing apparatus according to claim 1, further comprises:

a signal processing means for subjecting the digital audio broadcasting signal inputted into the digital input terminal to a signal processing corresponding to a type of signal identified by the identification means.

* * * * *